(12) United States Patent
Feller (10) Patent No.: US 7,775,706 B1
(45) Date of Patent: Aug. 17, 2010

(54) COMPENSATED HEAT ENERGY METER (76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/499,420

(22) Filed: Jul. 8, 2009

(51) Int. Cl.
*G01K 17/10* (2006.01)
*G01N 25/20* (2006.01)

(52) U.S. Cl. .............................. 374/29; 374/40; 374/39; 374/43

(58) Field of Classification Search ............. 374/29–40, 374/100, 141, 163–169, 179, 43–44; 73/19.04, 73/23.25, 23, 28, 25.03, 25.01, 30.03, 152.29, 73/152.31; 702/61; 165/81, 133, 294, 287
See application file for complete search history.

(56) References Cited

U.S. PATENT DOCUMENTS

| | | | | |
|---|---|---|---|---|
| 3,879,603 A * | 4/1975 | Sartorius | .................... | 700/274 |
| 4,163,388 A * | 8/1979 | November | ................... | 374/37 |
| 4,224,825 A * | 9/1980 | Feller | .......................... | 374/41 |
| 4,390,058 A * | 6/1983 | Otake et al. | ................ | 165/11.1 |
| 4,433,575 A * | 2/1984 | Rutherford | ................... | 73/202 |
| 4,448,545 A * | 5/1984 | Pelka et al. | ................... | 374/41 |
| 4,485,449 A * | 11/1984 | Knauss | ........................ | 702/46 |
| 4,539,816 A * | 9/1985 | Fox | ............................... | 62/87 |
| 4,779,458 A * | 10/1988 | Mawardi | ..................... | 374/41 |
| 4,813,270 A * | 3/1989 | Baillie | .................... | 73/861.04 |
| 4,883,115 A * | 11/1989 | Johanson et al. | ............ | 165/299 |
| 5,479,096 A * | 12/1995 | Szczyrbak et al. | .......... | 324/132 |
| 5,948,978 A | 9/1999 | Feller | | |
| 6,023,969 A | 2/2000 | Feller | | |
| 6,241,383 B1 | 6/2001 | Feller et al. | | |
| 6,443,003 B1 | 9/2002 | Bailis | | |
| 6,678,628 B2 * | 1/2004 | Ryan et al. | ................... | 702/132 |
| 6,931,352 B2 * | 8/2005 | Cryer et al. | ................. | 702/182 |
| 7,110,906 B2 * | 9/2006 | Vesel | .......................... | 702/130 |
| 2008/0198549 A1* | 8/2008 | Rasmussen et al. | ......... | 361/696 |
| 2008/0296010 A1* | 12/2008 | Kirchberg | .................... | 165/294 |
| 2009/0141768 A1* | 6/2009 | He et al. | ..................... | 374/144 |
| 2010/0006087 A1* | 1/2010 | Gilon et al. | ................. | 126/572 |

FOREIGN PATENT DOCUMENTS

| | | | | |
|---|---|---|---|---|
| CH | 607001 | A | * | 11/1978 |
| FR | 2894617 | A1 | * | 12/2005 |
| JP | 361288133 | A | * | 12/1986 |
| JP | 2007085255 | A | * | 4/2007 |

* cited by examiner

*Primary Examiner*—Gail Verbitsky
(74) *Attorney, Agent, or Firm*—David Kiewit (57) ABSTRACT

The specific heat of working fluids used in commercial heating systems commonly change with temperature and composition. Conventional heat metering systems assume a fixed value of the specific heat at a nominal temperature. This source of inaccuracy is removed by measuring the specific heat of a working fluid as a heating system operates and using the currently measured value in calculating the heat transferred. The real time specific heat measurement may be made by using a specific heat sensor having either a resistive heating element or a thermoelectric module.

6 Claims, 5 Drawing Sheets

COMPENSATED HEAT ENERGY METER

BACKGROUND OF THE INVENTION

1. Field of the Invention

This invention relates to calorimetry, and more specifically to calorimetric measurements made by combining flow rate and temperature signals.

2. Background Information

Heat meters, often referred to as BTU meters or net energy flow meters, determine the heat energy flow of a heat exchanger by measuring the flow rate of the heat exchanger fluid and the difference in temperature across the heat exchanger and by multiplying those measured quantities by factors selected to represent the specific heat of the fluid. The specific heat factor is generally selected based on a measured or presumed composition of the fluid and corrected for temperature.

In a practical application, such as an apartment building where a heat metered hydronic heating system has been installed, the water-based working fluid composition may not remain constant. This may be because of loss of some of the working fluid and replacement of it by a different fluid; because of chemical changes of one or more of the working fluid's components; or because of accumulation of debris in the plumbing system. As a result of any of these or other causes, the specific heat of the fluid can change from the value originally assumed, so that the heat meter no longer measures heat transfer accurately.

In U.S. Pat. No. 6,241,383 the inventor describes heat maintenance monitoring instrumentation for measuring the heat transfer between a heated surface and a heat transfer fluid to determine the condition of the heated surface to determine when maintenance is required. The disclosure of U.S. Pat. No. 6,241,383 is incorporated herein by reference.

In U.S. Pat. No. 6,023,969 and U.S. Pat. No. 5,948,978 the inventor describes instrumentation for providing, controlling and measuring the power to, and sensing the temperature of heated temperature sensors for the purpose of making a flow rate measurement using flow modulation. The disclosures of U.S. Pat. No. 6,023,969 and U.S. Pat. No. 5,948,978 are incorporated herein by reference.

BRIEF SUMMARY OF THE INVENTION

One aspect of the invention is that it provides a heat meter for measuring heat energy transferred by fluid flowing through a heat exchanger. This heat meter comprises: a fluid flow meter to measure a rate at which the fluid flows through the heat exchanger; inlet and outlet temperature sensors to measure the temperature drop across the heat exchanger; and a specific heat sensor to provide a specific heat value that can be combined with outputs from the flow meter and the inlet and outlet temperature sensors to provide an output representative of the heat energy transferred by the fluid flowing through the heat exchanger. In this case the specific heat sensor comprises circuitry operable to measure a ratio between energy supplied to a portion of a specific heat sensing element in thermal contact with the fluid and the thermal response to that energy.

Another aspect of the invention is that it provides a system and apparatus for measuring the respective heat energy transferred by each of a plurality of heat exchangers that are connected to a common source of working fluid. This apparatus comprises a specific heat sensor to provide an output representative of the actual current value of the specific heat of the working fluid. This specific heat sensor operates by measuring the relative values of thermal energy supplied to a sensing element in thermal contact with the fluid and the thermal response of the fluid to the supplied thermal energy. In addition, the system comprises a separate heat meter associated with each of the plurality of heat exchangers, where each heat meter comprises a respective inlet temperature sensor, a respective outlet temperature sensor, and a respective heat exchanger flow meter. The apparatus can thus combine the specific heat value characteristic of the fluid with respective outputs from each of the inlet temperature sensors, outlet temperature sensors and heat exchanger flow meters to determine the respective value of heat energy transferred by each of the heat exchangers.

Another aspect of the invention is that it provides an improvement to a known method of using a heat meter to measure heat transfer through a heat exchanger, where the improvement involves measuring a ratio between energy supplied to a sensor element in thermal contact with the fluid and a temperature change responsive to that energy; and then combining the measured ratio with the flow rate to determine the value of the specific heat of the fluid. The temperature change and flow rate may be combined as discussed in my U.S. Pat. Nos. 6,023,969 and 6,241,383. By accounting for the surface area of the sensor, the specific heat of the fluid is determined and then becomes a factor in determining the amount of heat flow taking place. The heat meter measurement then correctly measures the heat transferred between the fluid and the heat exchanger even if the heat transfer properties of the fluid change.

In a preferred embodiment of the invention a specific heat sensor comprises a single specific heat sensing element comprising a resistive heater and a temperature sensor. Its heating and sensing functions are time-shared. A control circuit heats this element and measures its temperature. The energy to raise the sensor's temperature a preset amount above that of the fluid, when corrected for the flow rate of fluid in contact with the sensor, is a measure of the specific heat of the fluid. Alternately, for a given energy input, the temperature rise of the sensor element, when corrected for fluid flow rate, is also a measure of the specific heat.

In another preferred embodiment of the invention a pair of temperature sensors are alternately heated and allowed to cool. The average power needed to raise their temperatures a preset amount above that of the averaged fluid temperature, when corrected for the fluid flow rate, is a measure of the specific heat of the fluid. In this embodiment a temperature sensor other than the one being heated provides a fluid temperature reference. Hence, sensor response time is a smaller factor in the precision of measurement of fluid specific heat.

Yet another preferred embodiment of the invention uses one or more thermoelectric (Peltier) modules (TEM) in a single probe. Supplying electric power to the TEM cools one of its surfaces while heating the other. When both surfaces of the TEM are in thermal contact with the working fluid, powering the TEM correspondingly cools and heats the fluid in contact with the probe. The power to provide a preset temperature difference between the TEM (or similarly responding) surfaces, taking into account the fluid flow rate, is a measure of the specific heat of the fluid. Alternately, the power provided to the TEM may be fixed while the TEM-produced temperature differences are measured to provide a measure of fluid specific heat. The TEM may be used in a time sharing mode, in which its open circuit voltage is used as a measure of ITS temperature differential. Alternately, separate temperature sensors may be used for that function.

If the TEM operating conditions (current, temperature, differential temperature, etc.) are carefully chosen the temperature drop on one of its surfaces will be a large fraction of the temperature rise of the other. The current direction through the TEM may be alternated so that each of the active surfaces in contact with the fluid is both heated at one time and cooled at another. These factors, plus the suspended mounting of the TEM in the preferred probe embodiment will tend to expose the fluid to about the same effects of convection currents on its active surfaces. The average fluid temperature will be relatively constant compared to operation of a resistively heated metallic sensor and this can be a significant advantage if the fluid is stationary or its quantity is relatively small.

Thus, it is an object of the invention to provide a heat meter which incorporates a provision for directly measuring the specific heat of a working fluid and compensating the energy measurement to take account of changes in specific heat.

It is also an object of the invention to provide an arrangement for measuring specific heat which can be used in a system using multiple heat meters for the purpose of providing a correction factor based on the specific heat of heat transfer fluid used by more than one heat meters.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

The various advantages of the present invention will become apparent to one skilled in the art by reading the following specification and subjoined claims and by referencing the following claims in which:

FIGS. 6A and 6B, taken together, depict a schematic block diagram of a preferred embodiment of the invention using two thermoelectric modules, wherein.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or.

Figure 1:
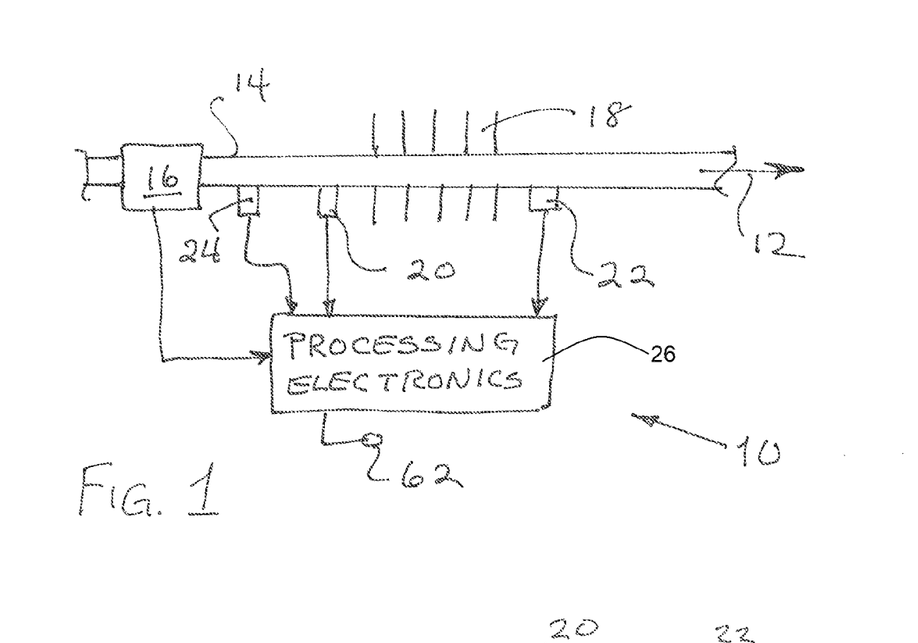
FIG. 1 is an overall block diagram of a heat meter in which a specific heat factor is measured in accordance with a preferred embodiment of the present invention.

Turning now to FIG. 1, one finds a block diagram of an embodiment of a heat meter 10 of the invention. A flow rate of a working fluid 12, flowing through a pipe 14 and a heat exchanger 18, is measured with a flow sensor 16. Inlet 20 and outlet 22 temperature sensors are used to measure the inlet and outlet temperatures of the heat exchanger 18, as is conventional in heat meters. This embodiment also provides a specific heat sensor 11 comprising a sensing element 24 and processing electronics 26. Although the specific heat sensing element 24 is depicted as being upstream of the inlet temperature sensor, the ensuing discussion will make it clear that this element could be situated in many locations, e.g., at the outlet of the heat exchanger. Moreover, because the specific heat sensing element 24 may be operable to measure fluid temperature, it could be used, in a time-shared mode, in place of one of inlet and outlet temperature sensors.

In an example of this embodiment, the heated temperature sensor 24 is periodically energized to raise its temperature above the ambient temperature of the working fluid. This temperature rise is measured and combined with the fluid flow rate signal by the processing electronics 26 to derive a measure of the fluid specific heat. This specific heat value is then used by the processing electronics 26, along with the flow rate and inlet and outlet temperatures to provide an output signal representative of the heat energy transferred by the heat exchanger 18. Because the improved heat meter provides heat flow signals based on the actual specific heat of the fluid rather than its presumed specific heat, meter accuracy is maintained when the fluid specific heat properties change.

Figure 2:
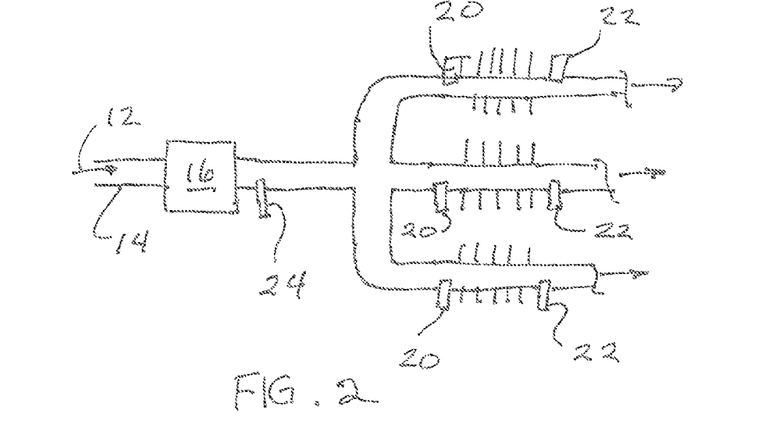
FIG. 2 is an overall block diagram of a system and apparatus for making a specific heat measurement and applying that measurement to a plurality of heat exchangers having a common working fluid source.

As shown schematically in FIG. 2, a single specific heat sensor can be used with a plurality of separately metered heat exchangers having a common source of working fluid.

Figure 3:
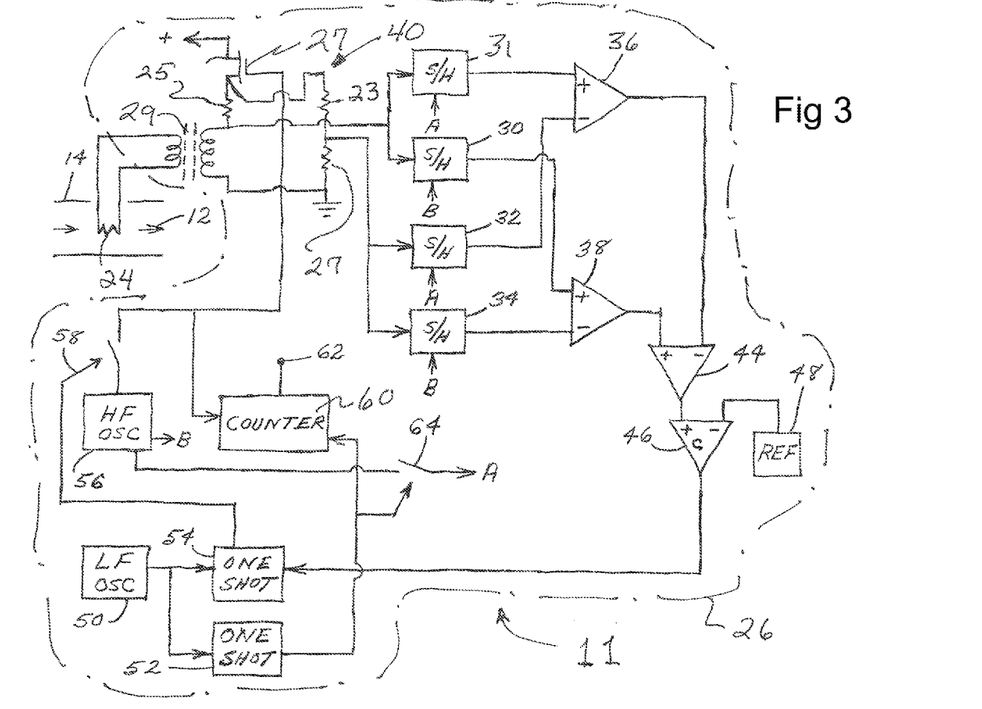
FIG. 3 is a simplified partial schematic and partial block diagram of an embodiment of the invention
Figure 4:
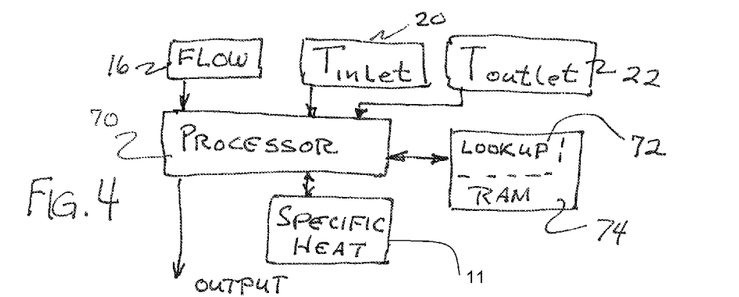
FIG. 4 is a block diagram of a system of the invention in which a measured specific heat value is corrected for fluid flow rate.

A schematic depiction of one embodiment of the processing electronics 26 appears as FIG. 3. In this embodiment a specific heat sensing element 24 that can be resistively heated is in thermal contact with the fluid 12. This sensing element 24 is used in two sequential modes of operation to both sense the temperature of the working fluid and to measure its own temperature when heated by having electric current passed through it. The sensing element is connected to a bridge circuit 40 comprising three resistors 25, 23, 27 and a transformer 29 that provides an impedance transformed representation of the resistance of the specific heat sensing element 24. The resistance of the specific heat sensing element, at the beginning of a measurement cycle, provides a measure of the temperature of the working fluid. Subsequently, after the bridge circuit 40 has been powered for a period of time, the change in resistance of the specific heat sensing element is indicative of the change in temperature associated with the energy supplied.

The specific heat sensing element 24, can take many forms. A coil of insulated temperature responsive wire, such as nickel or platinum, can be wound around a thin wall stainless steel tube through which the fluid flows. Such wire could also be wrapped around an electrically and thermally insulating rod for relatively fast response to fluid flows on its outside surface. Another form would be a straight or U-shaped length of thin wall nickel tube which can have the fluid flow through it or on the outside of its surface. Even though its resistance would likely be very low compared to a wound coil, a suitable transformer that can efficiently supply it with the required operating power is readily made.

In operation of the circuit of FIG. 3, a low frequency oscillator 50 provides cycle initiation pulses to two one-shot multivibrators 52, 54 to initiate a measurement cycle. One of these pulses is supplied at selected intervals that may, for example, range from a few seconds to a few hundreds of seconds. One-shot 54, when enabled by the initiation pulse, enables a switch 58 to route oscillator pulses, which are typically square waves having a selected frequency from 100 KHz to a MHz, from the high speed oscillator 56 to a bridge circuit control transistor 27 and counter 60 to accumulate oscillator cycles which provides a measure of the energy transferred to the fluid.

Also, at the beginning of an operational cycle, a one-shot multivibrator 52 resets the counter 60 and closes a switch 64 for a short period to route pulses from a high speed oscillator 56 to control terminals A of two sample and hold circuits 31, 32 connected to the two outputs of the bridge circuit 40. These sample and holds 31, 32, rectify the initial input signals and supply them as DC input voltages to a first differential amplifier 36. The positive portion of at least one oscillator cycle from the bridge circuit 40 is sensed to derive a fluid temperature measurement.

As the operational cycle continues, the cumulative heating effect of the increasing number of oscillator cycles delivered to the sensor 24 rapidly increases its temperature, which is repeatedly measured by the combination of a second pair 30, 34 of sample and hold circuits and a second differential amplifier 38. The initial and current temperature values output from the two differential amplifiers 36, 38 are input to a third differential amplifier 44 connected to a comparator 46 having its second input connected to a selected reference 48 which corresponds to the desired change in temperature of the sensing element.

When the desired change in temperature has been attained, the comparator switches to a high state. One-shot 54 is then reset so that the bridge is de-energized and the temperature of the sensor 24 drops toward that of the working fluid. It should be clear to the reader that an appropriate operating period of the low frequency oscillator 50 must be selected so that the heated sensor 24 can be adequately cooled before the operational cycle is started again. The counter accumulation is retained until the operational cycle begins again, at which time it is initially reset to zero. Until the counter is reset, its output 62 is a measure of the amount of energy required to raise the temperature of the specific heat sensor 24 and the fluid contacting it by the selected amount. This ratio of heat energy to temperature change, when corrected for flow rate effects, provides the measure of the specific heat.

The timing circuit functions can also be provided by a digital processor 70 used for the actual computation of specific heat based upon a fluid flow rate factor, the sensor heat energy input and its corresponding temperature rise, and a value, determined from the heated area, representative of the amount of working fluid heated during each cycle. The heater power increases with the flow rate of the fluid, and the processor can take this into account in computing the specific heat of the fluid by applying a factor from a lookup table 72 in a memory 74 to cover a range of flow rates. The processor may also utilize correction factors correcting for the change in power dissipated by the sensor as its resistance changes over a temperature range and for nonlinearities associated with heat removal from the sensing element's surface as a factor of flow rate. This processor may be the same one used for heat flow signal processing and computation.

Although the circuit embodiment described above operates by measuring an amount of energy required to raise a working fluid sample's temperature by a selected amount, it should be clear that various other circuits could be configured that operate in a complementary manner by providing a selected amount of heat energy and then measuring the temperature rise. Either approach can yield the desired measured ratio between energy transfer and temperature change.

Because the specific heat of the working fluid may change over a range of temperatures, and because some systems experience large temperature differentials, it may be desirable to vary the operating temperature range of the specific heat sensor. This can be done, for example, by recourse to another lookup table 72 used by the processor 70 to change the value of the reference voltage 48 furnished to the comparator 46 depicted in FIG. 3.

The resistive specific heat sensing element 24 may be in electrical contact, as well as thermal contact, with the working fluid. This design choice can reduce the mass of the heat sensing element 24 and therefore both increase its speed of response and improve thermal contact with the fluid. It may be noted that the electrical impedance of the sensor's heating element is typically several orders of magnitude lower than that of the fluid, so that electrical shunting associated with exposing elements or terminals two the fluid should contribute little error to the measurement. When the heated sensing element is in electrical contact with the fluid, one may prefer to use AC to heat the sensor so that electrolytic action at any electrically active surfaces of the sensor can be minimized. Electrolytic action can also generate bubbles at the sensing surface that degrade the heat transfer being measured.

Another preferred embodiment of the invention uses multiple specific heat sensing elements instead of using a single element. This allows one to synchronize the operation of the elements so that a fluid temperature is being measured by one element while a different one is being powered to heat the fluid. Because a separate temperature sensor always serves as a fluid temperature reference, sensor response time is a smaller factor in the precision of measurement of fluid specific heat. Moreover, when two or more sensors are used their outputs can be averaged to provide a better measurement.

Yet another preferred embodiment of the invention uses a probe 80 having one or more thermoelectric module(s) (TEM) 84 in thermal contact with the fluid 12. A DC voltage applied to a TEM cools one of its surfaces and heats the other, and both surfaces can be thermally coupled to the fluid 12 by appropriate thermal conductors 82, 88. Thus, the TEM can both cool and heat different portions of the fluid in contact with the probe. As with the resistive sensor element discussed above, the power to provide a preset temperature difference between the TEM surfaces, taking into account the fluid flow rate, is a measure of the specific heat of the fluid. Alternately, the power provided to the TEM may be fixed and the TEM surface temperatures measured to provide a measure of fluid specific heat.

Figure 5A:
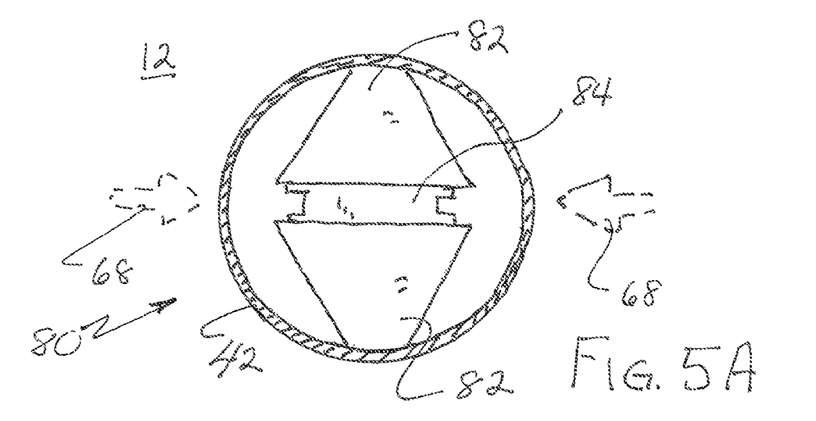
FIG. 5A is a partly schematic end view of a single thermoelectric element mounted in a sectioned housing.

A probe 80 comprising a single TEM 84 is depicted in FIG. 5A. The TEM 84 is thermally coupled to the working fluid 12 through a thin-walled tube 42 by thermal conductors 82, which may be fabricated from aluminum or copper. A probe of this sort is preferably fabricated by distorting a thin-walled cylindrical tube by forces exerted along directions indicated by the phantom arrows 68 and then inserting a subassembly comprising the TEM 84 and the thermal conductors 82. When the forces are released, the distorted tube returns to a shape nearer its original one and clamps the subassembly in place.

The current direction through the TEM may be alternated so that each of the active surfaces in contact with the fluid is both heated at one time and cooled at another. A sensing probe operated in this manner will tend to expose the fluid to about the same effects of convection currents at both active surfaces of the probe. The average fluid temperature will be relatively constant compared to the heated sensor kind of operation and this can be a significant advantage if the fluid is stationary or the quantity of fluid being measured is relatively small.

In a particular preferred embodiment depicted in FIG. 5A, the TEM 84 is a Model TE-31-0.6-1.0, supplied by T E Technology of Traverse City, Mich.; the thermal conductors 82 are custom-fabricated from aluminum and the deformable tube 42 is a 0.369 inch diameter hardened stainless steel tube having a 0.009 inch wall thickness.

Figure 5B:
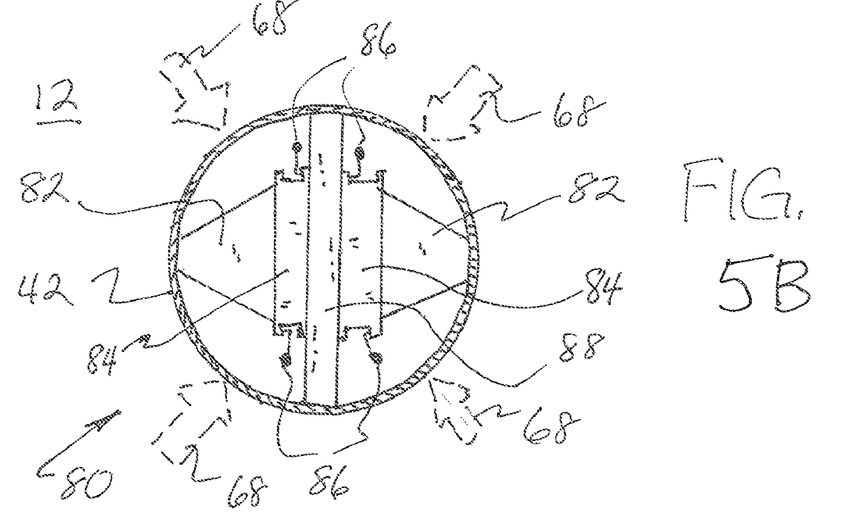
FIG. 5B is a partly schematic end view of a pair of thermoelectric elements mounted in a sectioned housing.

Turning now to FIG. 5B, one finds a preferred TEM probe 80 of the invention in which two TEMs 84 are thermally coupled, series aiding, to the working fluid 12 through a thin-walled tube 42 by thermal conductors 82, 88 to sum their difference temperatures. In addition, a flat thermal conductor 88 is sandwiched between two TEMs 84 and is also coupled through the tube wall to the working fluid. The TEMs and thermal conductors form a subassembly having dimensions selected so that it can be inserted into a thin-walled cylindrical tube 42 when the tube has its shape distorted by forces exerted along directions indicated by the phantom arrows 68, as done in the single TEM configuration.

It may be noted that in both the depicted single and double TEM arrangements, the TEMs are conventional modules in which the active thermoelectric material is sandwiched between thin alumina plates and in which electrical leads 86 are connected to metallization traces on the inner sides of the alumina plates. Thus, each TEM is thermally connected to, but electrically isolated from the metallic thermal conductors 82, 88 by the alumina plates.

In a single-TEM probe the operating conditions may be carefully chosen so that the heat removal from one of its surfaces will be a large portion of the heat added on the other. When two or more TEMs are used the drive currents can be adjusted individually to provide closer equalization. Moreover, using two TEMs stacked one atop the other, allows one to reduce the differential temperature across each TEM for the same temperature change at the active surfaces of the probe.

There are several ways to measure the temperature difference across a thermoelectric module in contact with a working fluid. One is to provide separate temperature sensors, such as platinum resistors, near each of the surfaces. This approach may provide the greatest accuracy and allows measurement at any time in the operating cycle. Another approach is to measure the open circuit voltage of the module at time when the device is not being powered.

Figure 6A:
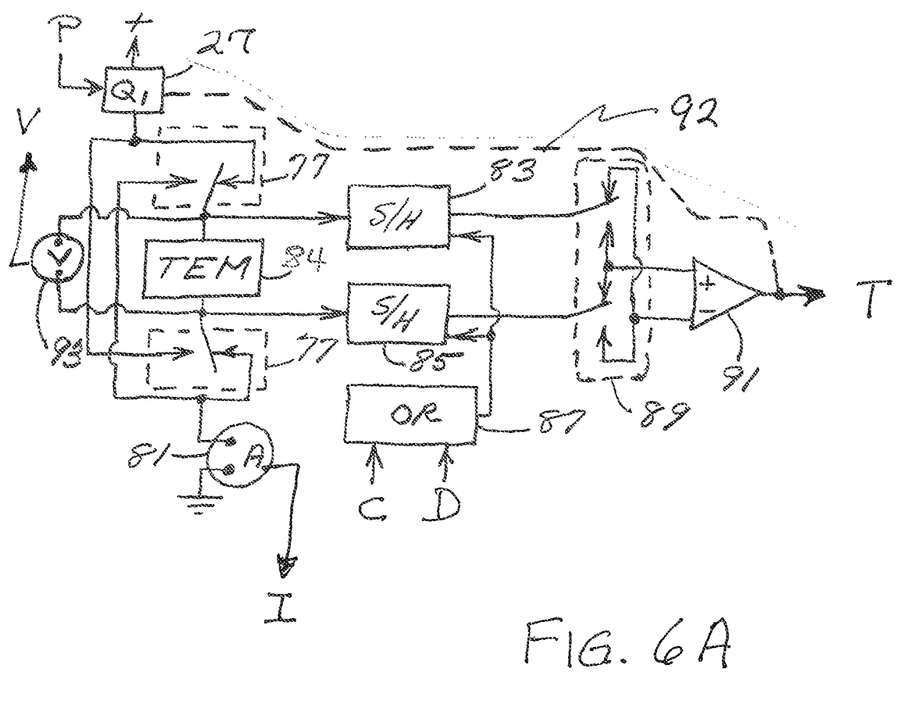
FIG. 6A depicts the measurement and power portions thereof.
Figure 6B:
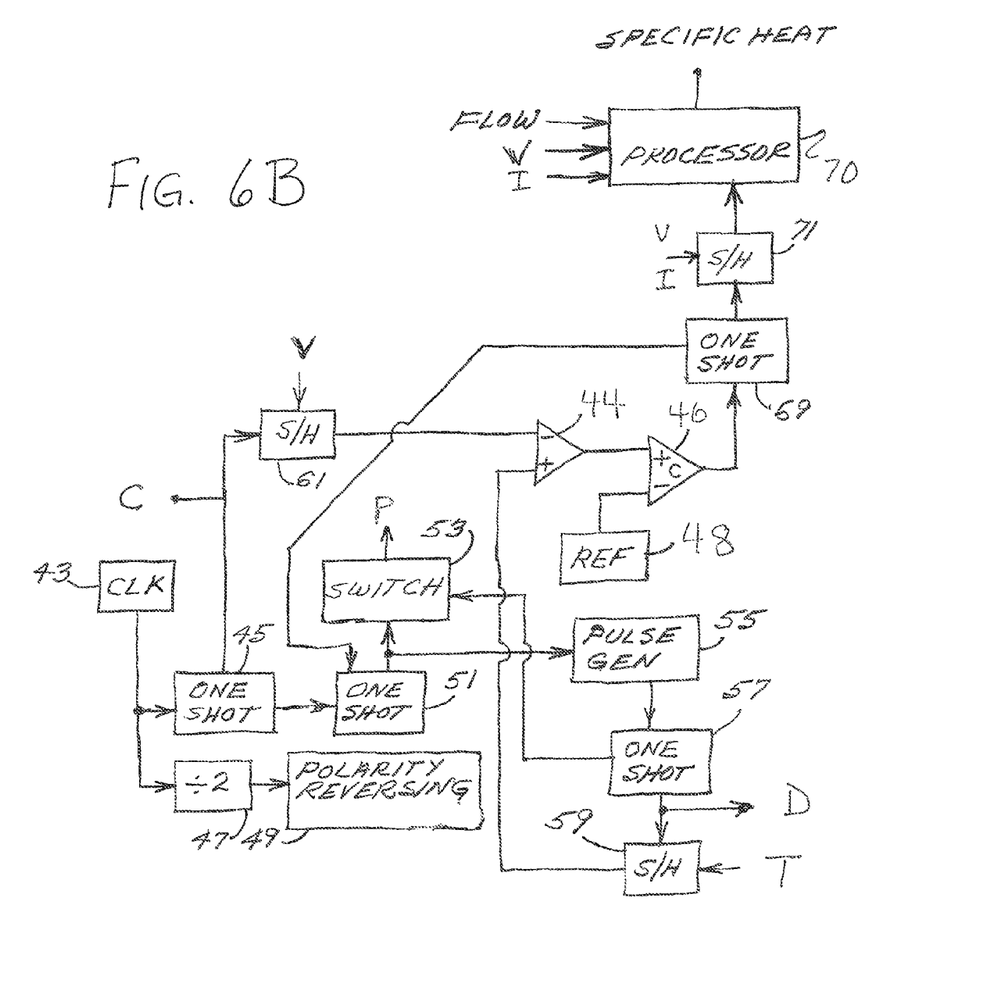
FIG. 6B depicts the signal and timing management portions thereof; and characters V, I, C, D, and T denote linkages between the two portions.

A preferred circuit arrangement for operating a TEM-configured module is depicted in FIGS. 6A and 6B, where FIG. 6A provides a schematic depiction of circuitry for powering the TEM and measuring the temperature difference across its active surfaces, and where FIG. 6B provides a schematic depiction of circuitry for controlling the measurement and processing the signals. An operational cycle involves measuring the temperature difference across the TEM after it has been unpowered long enough that its temperature difference has reduced sufficiently and then repetitively measuring the change in the temperature difference during a powered period.

In this circuit of FIGS. 6A and 6B a clock 43 provides periodic pulses at relatively long intervals to a one-shot 45 at the beginning of the operational cycle. The one-shot 45 enables a sample and hold 61 to detect the voltage (V) across the TEM when its active surfaces are preferably at the same temperature. This voltage is routed to the negative input of differential amplifier 44 that feeds the positive input of a comparator 46 that has its negative input connected to a voltage reference 48.

The output pulse from the one-shot 45 also triggers a one-shot 51 which enables a switch 53 and a pulse generator 55. The switch 53 provides an output P that operates a transistor, or other suitable power control device 27 to power the TEM (s). The pulse generator 55 provides a series of relatively high frequency pulses to a one-shot 57 which enables a sample and hold 59 to detect the signal T, corresponding to the TEM temperature difference, and to route it to the positive input of the differential amplifier 44.

The one-shot 57 also disables a switch 53 during its relatively short pulse width in order to remove power from the TEM when its temperature difference is measured. For example, the clock may provide a pulse to initiate an operating cycle every 10 seconds while one-shots 45 and 57 produce 10 microsecond wide pulses, and the pulse generator frequency is 1 KHz. When the TEM is nominally in its powered mode, it is actually only being powered 99% of the time and is not being powered for the remaining 1%, while its temperature difference is being detected.

When the output signal from the differential amplifier 44 exceeds that of the voltage reference, which corresponds to a selected preset temperature difference across the TEM 84, the comparator 46 changes state and triggers a one-shot 69 to reset the one-shot 51 and to thereby terminate the powered portion of the cycle, which is restarted by the next pulse from the clock 43. The one shot 69 also enables a sample and hold 71 to detect the TEM power consumption from its powered voltage, V, 93 and current, I, 81 measurements and store the corresponding signal levels for the signal processor 70. The signal processor also receives flow related signals to enable it to compute the fluid's specific heat which it provides as an output signal.

As noted above, it is desirable to take data from a TEM probe in which the hot and cold sides are reversed. In the circuit of FIGS. 6A and 6B, this is provided by dividing the clock pulse generation frequency by two by means of a frequency divider 47 connected to activate a polarity reversing switching 49 to alternate the direction of the current flow through the TEM. The corresponding differential temperature measurements are then summed and averaged.

In the depiction of FIGS. 6A and 6B, the TEM is connected to a phase reversing switch 77 which is powered through Q1. Either one of the one-shots 45, 57 provide temperature sensing pulses to an OR circuit 87 to enable sample and holds 83, 85 to detect the TEM voltage while a phase reversal switch 89 controls the polarity of the signals to enable their sum to be amplified by a differential amplifier 91. The TEM may be switched on and off to control its pumping action and dissipation, or it may be controlled in a linear negative feedback circuit. A dashed line between the TEM output T and Q1 is used to indicate the negative feedback approach.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A heat meter for measuring heat energy transferred by fluid flowing through a heat exchanger, the heat meter comprising:
a fluid flow meter operable to provide a flow signal responsive to a rate at which the fluid flows through the heat exchanger;
an inlet temperature sensor operable to provide an inlet temperature signal representative of a temperature of the fluid flowing into the heat exchanger;
an outlet temperature sensor operable to provide an outlet temperature signal representative of a temperature of the fluid flowing out of the heat exchanger;
a specific heat sensor comprising circuitry operable to measure a ratio between energy supplied to a thermoelectric specific heat sensing element having first and second surfaces in thermal contact with the fluid and an associated change of temperature of the element and to generate therefrom a specific heat signal, wherein the specific heat sensor circuitry is operable to measure a temperature difference between the first and second surfaces of the thermoelectric sensing element responsive to a selected amount of energy being supplied to the thermoelectric element; and
signal processing circuitry operable to combine the flow signal, the inlet temperature signal, the outlet temperature signal and the specific heat signal to provide an output representative of the heat energy transferred by the fluid flowing through the heat exchanger.

2. In a method of measuring heat energy transferred by a heat exchanger, the method comprising combining a flow rate at which fluid flows through the heat exchanger, an inlet temperature of the fluid flowing into the heat exchanger, an outlet temperature of the fluid flowing out of the heat exchanger and a value of a specific heat of the fluid, an improvement comprising:
measuring a ratio between energy supplied to a sensor element comprising a thermoelectric element in thermal contact with the fluid and a temperature change responsive thereto; the thermoelectric element having a first surface heated by the supplied energy and a second surface simultaneously cooled thereby; wherein measuring the ratio comprises supplying energy to the thermoelectric element and then measuring a voltage generated by the thermoelectric element to determine a temperature difference between the first and second surfaces.

3. The method of claim 2 wherein determining the temperature difference between the first and second surfaces of the thermoelectric element comprises: measuring a first voltage generated by the thermoelectric element for a first of two applied polarities; then reversing the polarity; then measuring a second voltage generated by the thermoelectric element for the second of the two polarities; and then averaging the two voltages to determine the temperature difference.

4. In a method of measuring heat energy transferred by a heat exchanger, the method comprising combining a flow rate at which fluid flows through the heat exchanger, an inlet temperature of the fluid flowing into the heat exchanger, an outlet temperature of the fluid flowing out of the heat exchanger and a value of a specific heat of the fluid, an improvement comprising:
measuring a ratio between energy supplied to a sensor element in thermal contact with the fluid and a temperature change responsive thereto; the sensor element comprising a thermoelectric element having a first surface heated by the supplied energy and a second surface simultaneously cooled thereby; wherein measuring the ratio comprises supplying energy to the thermoelectric element and subsequently measuring the temperature change by means of respective temperature sensors in thermal contact with the first and second surfaces.

5. The method of claim 4 wherein the step of determining the temperature difference between the first and second surfaces of the thermoelectric element comprises determining an average temperature change by: determining a first temperature difference between the respective temperatures of the first and second surfaces, measured by the respective temperature sensors when a first voltage polarity is applied to the thermoelectric device; then reversing the polarity of the voltage; then determining a second temperature difference between the first and second surfaces; and then averaging the first and second temperature differences to determine the average temperature change.

6. Apparatus for measuring a respective value of heat energy transferred by each of a plurality of heat exchangers connected to a common source of working fluid, the apparatus comprising:
a flow rate sensor operable to provide a signal responsive to the flow of the working fluid from the source thereof;
a specific heat sensor operable to provide a specific heat value responsive to a specific heat of the fluid, the specific heat sensor comprising circuitry operable to measure a ratio between an amount of energy supplied to a specific heat sensing element and a temperature change thereof; the specific heat sensing element comprising a thermoelectric element electrically connected so that, when powered, a first surface portion is heated and a second surface portion is cooled;
a respective heat meter associated with each of the plurality of heat exchangers, each heat meter comprising a respective inlet temperature sensor, a respective outlet temperature sensor, and a respective heat exchanger flow meter; and
circuitry operable to combine the specific heat value with respective outputs from each of the inlet temperature sensors, outlet temperature sensors and heat exchanger flow meters to determine the respective value of heat energy transferred by each of the heat exchangers.

\* \* \* \* \*